Figure 14:
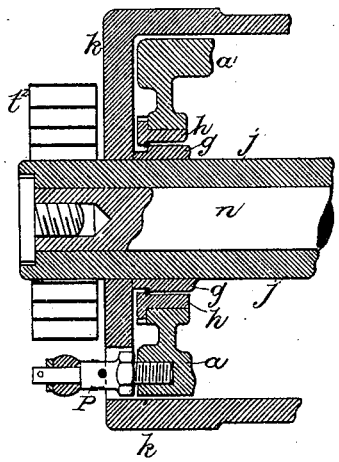

(No Model.) 5 Sheets—Sheet 1.
F. A. WEYHER.
SPEED REGULATOR.
No. 518,799. Patented Apr. 24, 1894.
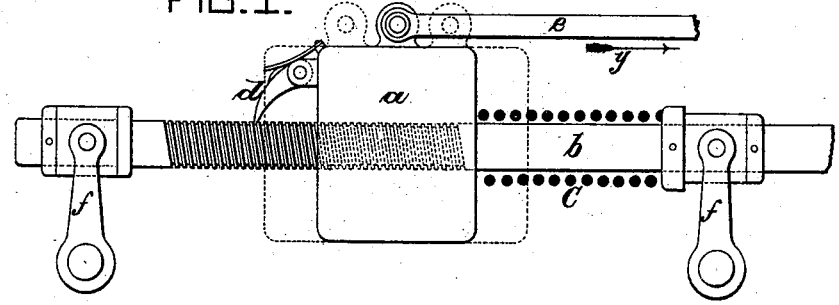
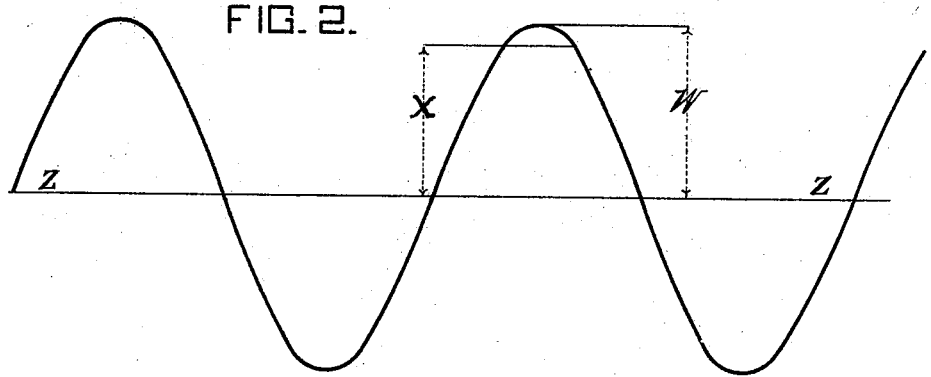
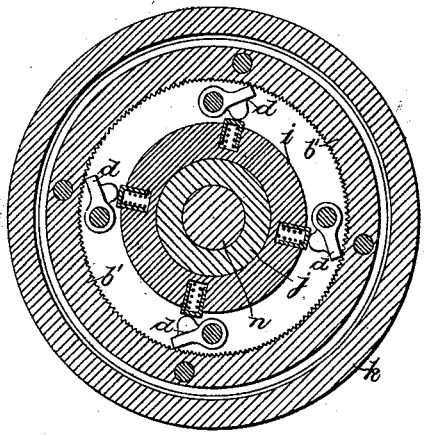 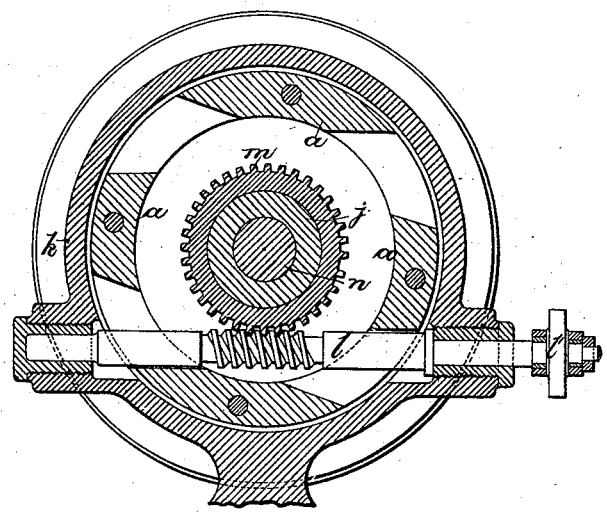
WITNESSES:
George Baumann
Th. F. Keller
INVENTOR
Frederic Albert Weyher
BY
Howson & Howson
his ATTORNEYS.

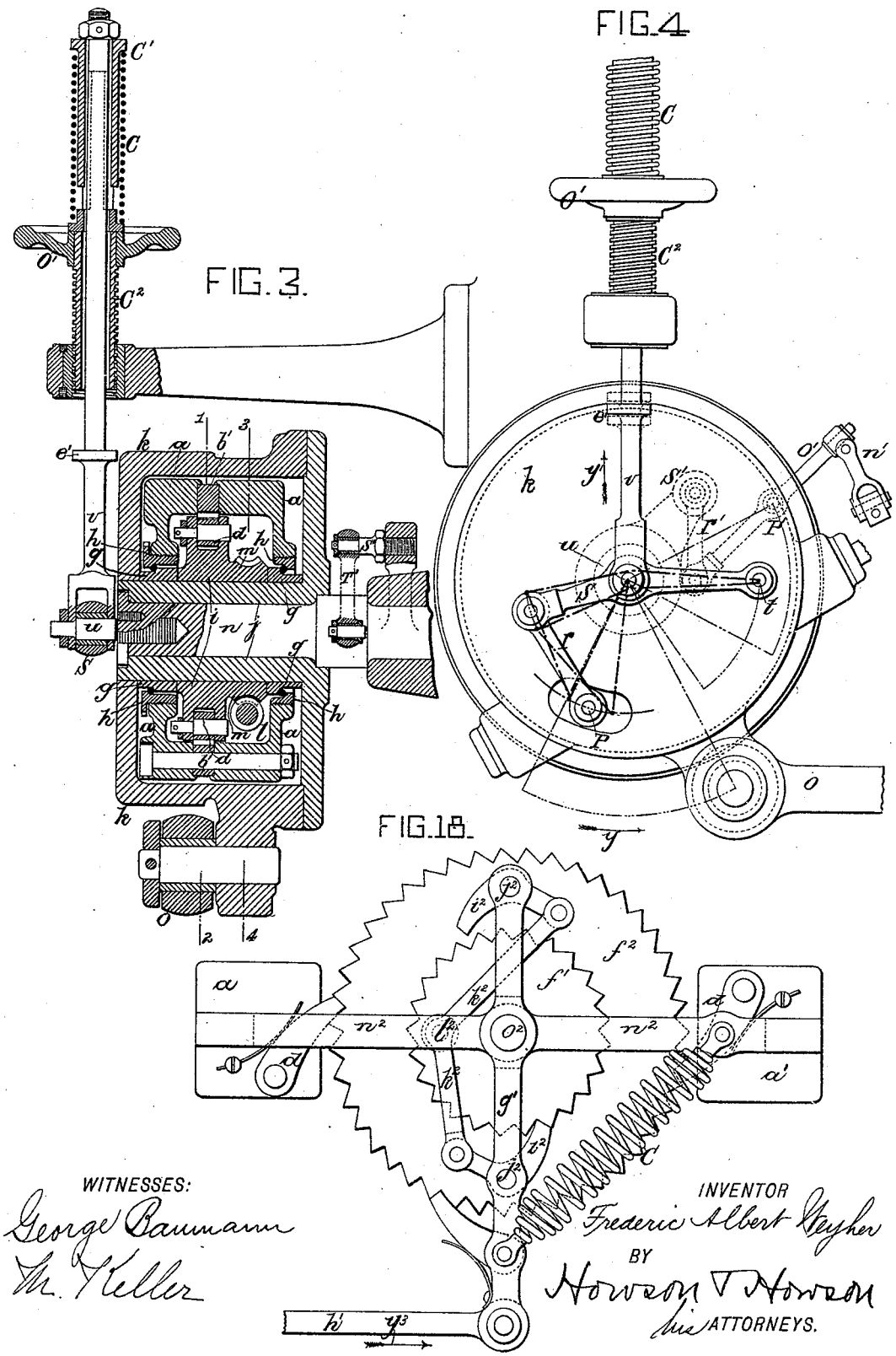

(No Model.) 5 Sheets—Sheet 3.
F. A. WEYHER.
SPEED REGULATOR.
No. 518,799. Patented Apr. 24, 1894.
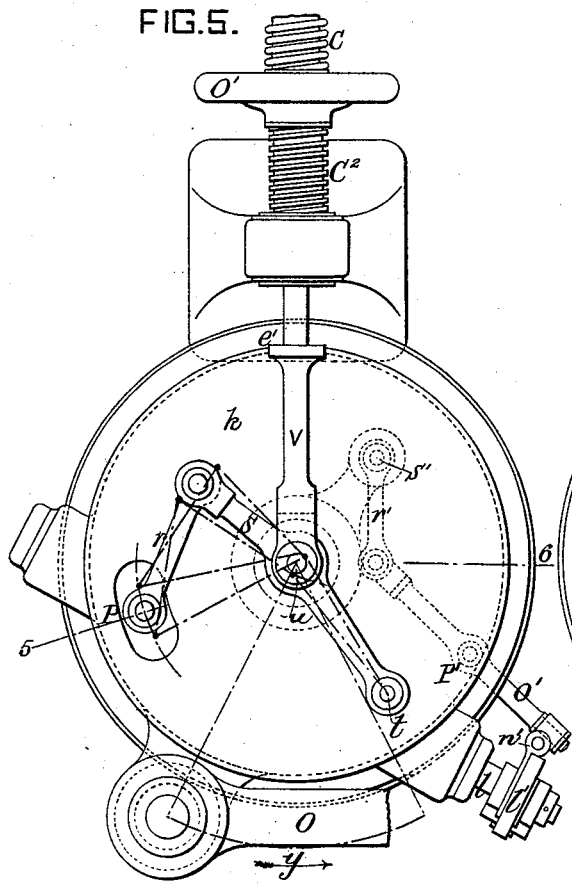
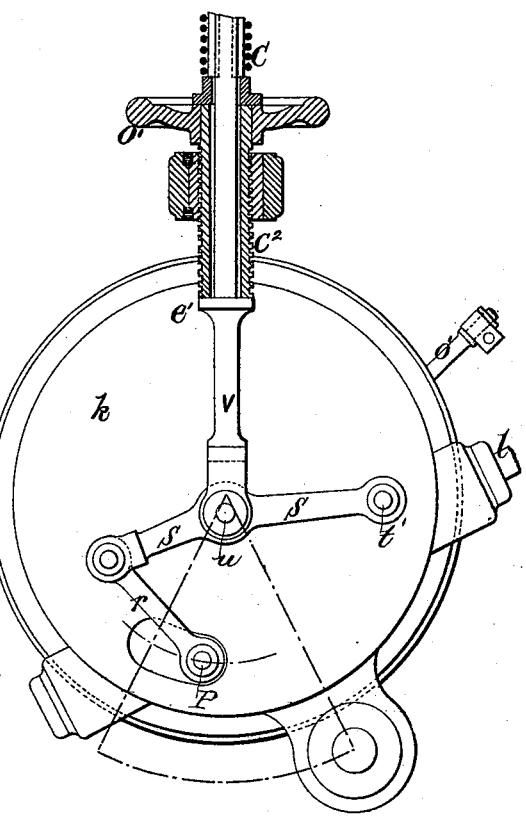
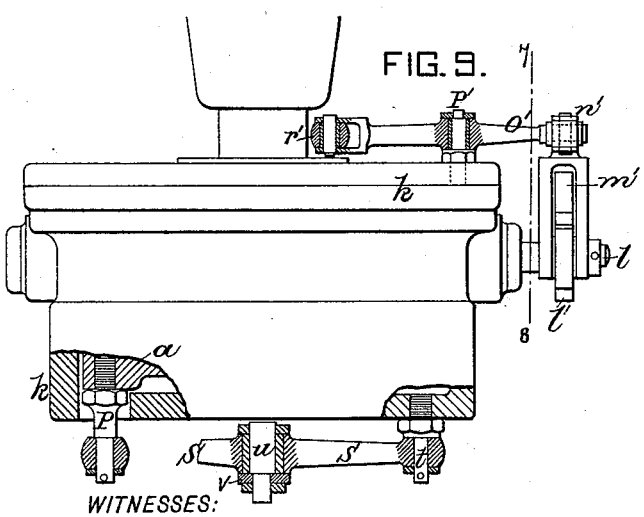
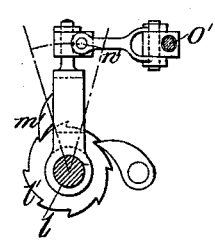
WITNESSES:
George Baumann
Th. F. Keller
INVENTOR
Frederic Albert Weyher
BY
Howson & Howson
his ATTORNEYS.

(No Model.) 5 Sheets—Sheet 4.
F. A. WEYHER.
SPEED REGULATOR.
No. 518,799. Patented Apr. 24, 1894.
FIG. 13.
FIG. 12.
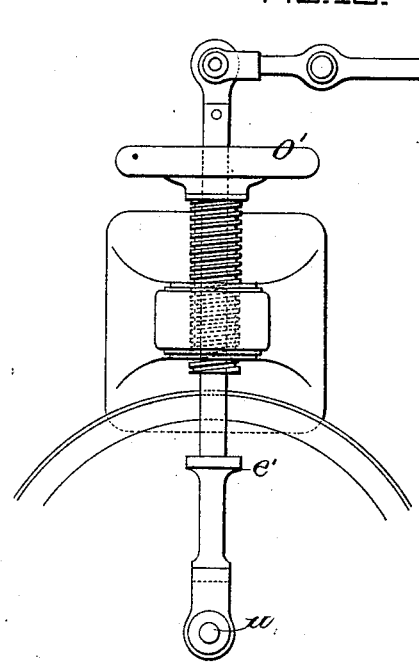
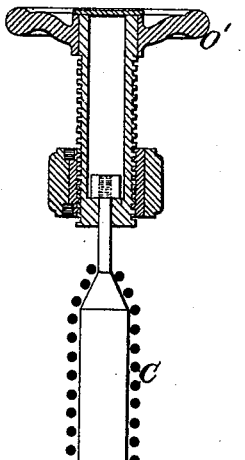
FIG. 11.
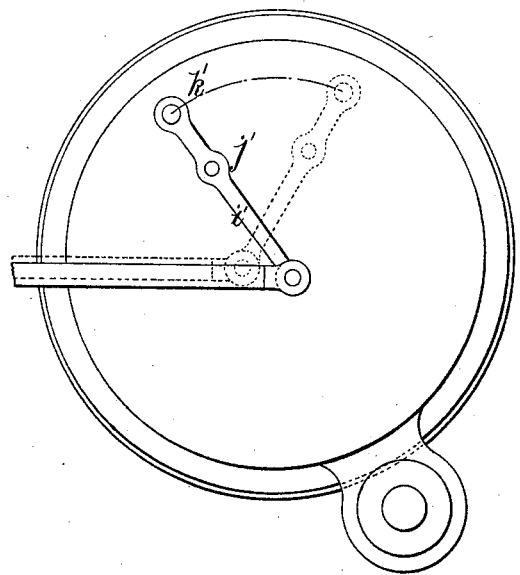
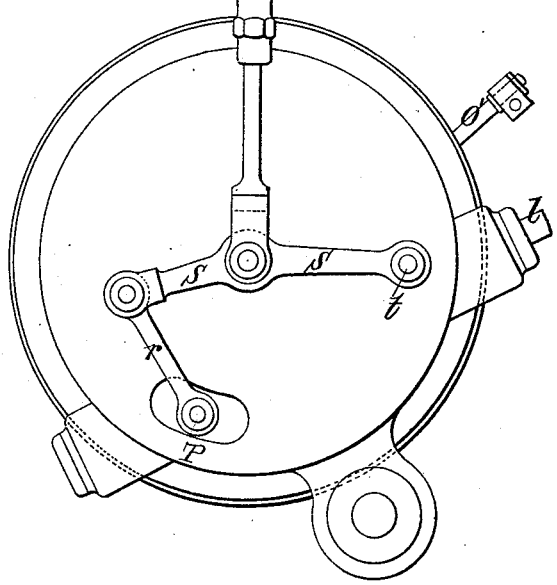

(No Model.) 5 Sheets—Sheet 5.

F. A. WEYHER.
SPEED REGULATOR.

No. 518,799. Patented Apr. 24, 1894.

WITNESSES:
Th. Keller
George Baumann

INVENTOR
Frederic Albert Weyher
BY
Howson & Howson
his ATTORNEYS.

UNITED STATES PATENT OFFICE.

FREDERIC ALBERT WEYHER, OF PANTIN, FRANCE.

SPEED-REGULATOR.

SPECIFICATION forming part of Letters Patent No. 518,799, dated April 24, 1894.

Application filed January 15, 1894. Serial No. 496,944. (No model.) Patented in France July 11, 1893, No. 231,459.

*To all whom it may concern:*

Be it known that I, FREDERIC ALBERT WEYHER, engineer, a citizen of the Republic of France, residing in Pantin, (Seine,) France, have invented an Improved Speed-Regulator, (for which I have obtained a French patent, dated July 11, 1893, No. 231,459,) of which the following is a specification.

The improved speed regulator or governor forming the object of my invention is based upon the utilization of the variations in the *vis viva* or force of momentum produced by variations or changes of speed of a moving body or in other terms upon the direct utilization of the forces due to the inertia of a mass or weight moving at different or changing speeds. This direct utilization of the forces of inertia for regulating purposes has for its principal object and advantages (in addition to others hereinafter specified) the protection of the regulating mass or weight hereinafter referred to as the "weight" from the influence of all forces other than those which are directly utilized in the operation of the apparatus.

When, in order to elucidate the foregoing statement, we compare the regulating apparatus or governor forming the object of my invention with an ordinary centrifugal governor for example this being the type most commonly employed for regulating or controlling speed we find that in the centrifugal governor the regulating action depends on the centrifugal force of moving weights or pendulums. Now the disturbing actions or influences which render the action of centrifugal force more or less defective for the purposes of regulation are as follows; namely: first, the inertia of the regulating weights or pendulums and of their counterweights; second, the frictional resistance of the several moving parts.

In the improved governor constructed according to my invention the regulating action is produced by the inertia of the moving weights. Disturbing influences are non existent, the inertia of the parts and the friction co-operate in obtaining the normal working of the regulating action without introducing any disturbing influence.

The means employed according to this invention for utilizing for regulating or governing purposes the variations in the momentum (or *vis viva*) of a weight moving at different speeds are the following namely: A heavy weight is engaged between two drivers which alternately impel it in opposite directions so as to impart to it a reciprocating or oscillating motion. This reciprocating movement necessarily involves variations in speed or rate of motion of the weight the direction of the motion being changed or reversed at each oscillation. These variations in the speed modify the momentum or impetus of the weight and cause it to exert correspondingly varying reactions or forces upon the drivers. The value of these reactions as exerted on each driver passes from zero to a maximum and from the maximum to zero in the course of each double oscillation. One of the drivers is applied to the weight by a constant and predetermined pressure less than the maximum force exerted by the weight upon this driver by reason of its inertia during one normal oscillation. This driver is consequently displaced at each oscillation during the whole of the time during which the force of inertia of the weight is greater than the force applied to it by the driver. This displacement is consequently proportionate to the force of inertia of the weight and consequently proportionate to the square of the speed. The other or second driver is movable and subject to two movements, on the one hand it moves with the weight when the first driver yields to the force of inertia and afterward prevents the weight from returning to its original position when the force of inertia ceases to be greater than the force by which the first driver is applied to the weight; on the other hand it is brought back or caused to return at each oscillation, by a movement in the opposite direction to the first movement, to an extent which is constant or uniform and is independent of the forces of inertia and of the speed. In short the first driver acts with constant force and is subjected to an extent of displacement varying with the square of the speed and the second driver is constantly displaced in the opposite direction to the first and exerts a force varying with the square of the speed. This second driver moreover partakes of the variable displacements of the first driver moving in the same direction as the latter.

The action of the apparatus is as follows: The weight partakes of an oscillating motion which is communicated to it by the intervention of the two drivers. This oscillating motion develops in each driver reactions due to the inertia of the weight which cause a displacement of the first driver and consequently of the weight and of the second driver to a variable extent proportionate to the forces of inertia that is to say to the square of the speed. The second driver and consequently the weight and the first driver are subject to a constant displacement in an opposite direction to the first. This displacement is regulated by a direct transmission of motion and is independent of the forces of inertia and of speed. When these two displacements (variable displacement and constant displacement in the opposite direction) are equal the weight performs in space during the forward and backward movement of one oscillation two similar movements corresponding in each direction with the length of the oscillation proper plus one of the two displacements. This condition corresponds with the normal speed of the motor or engine which is to be maintained by the action of the regulator or governor. The displacement of the second driver being constant and that of the first being a function of the speed and of the force with which this driver is applied to the mass the normal speed to be maintained by the action of the governor may be regulated as required by suitably adjusting the force with which the first driver is applied to the weight. The governor working at normal speed and the displacement of the weight being equal in both directions the displacement of the first driver increases when the speed is accelerated. The displacement of the second driver being constant, the limits of the movement of the weight are displaced to an extent equal to the excess of the displacement of the first driver over its normal displacement. Each oscillation thus contributes to displace the limits of the movement of the weight until the normal speed is regained. At this moment the displacements of the two drivers again become equal and the oscillations of the weight again become similar to those which it described before the disturbance took place but the limits of its movement occupy in space a position different from that which they occupied before the disturbance. When the speed diminishes in place of increasing the displacement of the first driver diminishes. The displacement of the second driver being constant the limits of the movements of the weight are displaced as in the preceding instance but in the opposite direction to an extent equal to the difference between the displacement of the first driver and its normal displacement. This displacement of the limits of motion of the weight takes place at each oscillation until the normal speed has been regained. All changes from the normal speed consequently have the effect of displacing in space the limits of the movements of the weight and this displacement is utilized for actuating devices employed for restoring the normal speed such for example as the distribution valve or throttle valve of a steam engine. By these means the variations in the momentum of a weight moved at variable speeds are utilized for controlling speed by means of the displacement of the limits of the movement of the weight partaking of an oscillating motion this oscillating motion being communicated to the weight in one direction by a driver having a constant force and a displacement varying in proportion to the square of the speed under the action of the force of inertia and in the opposite direction by a second driver having a constant displacement which is independent of the speed and of the force of inertia. And in order that my said invention may be fully understood I shall now proceed more particularly to describe the same and for that purpose shall refer to the several figures on the annexed sheets of drawings the same letters of reference indicating corresponding parts in all the figures.

Figure 1 of the accompanying drawings illustrates in elevation a simple arrangement of apparatus or speed governor constructed according to my invention. Fig. 2 is a diagram showing the force or reaction exerted by the weight of the governor upon each of the drivers. Figs. 3 and 4 represent in section and in side elevation respectively a modification in the construction of the governor according to which the regulating weight partakes of a circular motion. Figs. 5 and 6 illustrate this modification in elevation and partly in section with the parts occupying different relative positions. Figs. 7, 8 and 9 illustrate this arrangement in section the sections being taken on the lines 1—2, 3—4, and 5—6 respectively in Figs. 3 and 5. Fig. 10 illustrates a detail of the apparatus in section on the line 7—8 Fig. 9. Fig. 11 illustrates in elevation a modification of the part employed for actuating the regulating device. Figs. 12 to 18 illustrate other modifications of the construction of the governor as hereinafter described.

The governor illustrated in Fig. 1 is provided with a weight $a$ supported upon a rod $b$ on which it is capable of sliding longitudinally a spring $c$ (constituting the driver hereinbefore referred to as acting with constant force, the tension or stress of this spring being equal to the force X hereinafter referred to) and a pawl $d$ connected to the weight $a$ being caused by the action of a spring to engage with a screw thread provided on the rod $b$ so as to act as the second driver. The weight $a$ is connected by a rod $e$ with the controlling device consisting of the throttle or expansion valve of the steam engine for example. The rod $b$ is supported by lever arms $f$ actuated by suitable mechanism for transmitting motion worked by the engine or motor to be governed and imparting a vibrating or oscillating motion or movement to the said arms. This movement is transmitted to the weight $a$ through the intervention of the spring $c$ and pawl $d$. The rod $b$ also receives through suitable mechanism worked by the motor or engine to be governed a rotary motion which displaces the pawl $d$ acting in the same way as a nut to a regulated distance in the opposite direction to that indicated by the arrow $y$.

We will now proceed to consider with reference to the diagram (Fig. 2) the forces or reactions exerted by the weight $a$ upon each of the drivers. Those points in the curved line represented in this diagram (Fig. 2) where the said line bisects a straight line Z correspond with the movements at which these forces are nil owing to their change of directions. The parts of the curved line situated above the straight line Z represent the forces exerted upon one of the drivers and those situated below the line Z represent the forces exerted upon the other driver. Assuming that the parts situated above the line Z represent the force of inertia exerted upon the driver which acts with constant force for example the extreme constant distance W of the part of this curve farthest from the line Z represents the maximum force which the inertia of the weight would exert upon this driver if it were stationary. The constant force with which this driver is applied to the weight will be according to the foregoing statement inferior to the force W. Let it be equal to a force represented by the line X for example. At the moment when the weight passes to the point corresponding with this force X there will be equilibrium between this force applying the driver to the weight and that due to inertia by which the weight $a$ is applied to the driver. The weight $a$ will consequently be displaced beyond this position carrying the two drivers with it as hereinbefore explained.

We will now proceed to consider further the two movements of the rod $b$. The first of these two movements namely that of oscillation transmitting motion to the weight $a$ produces upon the spring $c$ and upon the driving pawl $d$ the reactions represented by the curved line in Fig. 2. When the force of the reaction upon the spring $c$ exceeds the tension or pressure of this spring the latter yields and the weight $a$ slides upon the rod $b$ in the direction of the arrow $y$ drawing the pawl $d$ with it. At the end of the sliding movement or displacement of the weight $a$ upon the rod $b$ the pawl $d$ has slipped over the screw threads and moved along this rod to a distance equal to three threads of the screw for example when the speed is normal. It then re-engages with the threads and consequently prevents the weight $a$ which has been displaced and has compressed the spring $c$ from returning to its former position under the action of this spring when the reaction due to inertia again becomes inferior to the tension of the spring. The second movement of the rod $b$ namely the rotary movement produces as hereinbefore explained a displacement of the pawl $d$ and this displacement is equal to that of the weight $a$ upon the rod $b$ in the direction of the arrow $y$ at normal speed being consequently equal to the width of three screw threads. As the result of the combined or successive action of these two displacements the weight at the end of one double oscillation returns to the same position which it occupied at the commencement. When the speed increases the first displacement due to inertia of the weight is greater being augmented to say four threads for example in place of three in the direction of the arrow $y$. The displacement in the opposite direction being constant the limits of the movement of the weight $a$ are now moved to the extent of one thread in the direction of the arrow $y$. This movement causes the weight $a$ to act in a suitable manner through the rod $e$ upon the regulating device of the motor and restore the latter to the normal speed. A similar effect is produced but in the opposite direction when the speed diminishes. The tension of the spring $c$ is maintained by suitably proportioning the same practically constant in all positions. The displacement of the limits of the movement of the weight $a$ upon the rod $b$ consequently continues in case of any continued disturbance or irregularity until the speed has recovered its normal rate it being only at this rate of speed that the movements of the weight $a$ upon the rod $b$ are equal in both directions.

The governor hereinbefore described and illustrated in Fig. 1 in its original or most simple form is preferably constructed in practice in a form such as that represented in Figs. 3 to 10 which enables the same principle to be applied with more advantage in practice. As represented in these figures the regulating weight $a$ is of circular shape being in the form of a fly wheel and capable of rotating freely upon two annular bearings $g$ on which it is supported by rings or cups $h$ working on anti friction balls. This fly wheel carries a toothed ring $b'$ engaging with driving pawls $d$. These pawls are carried by a sleeve $i$ loose upon a tube $j$ attached to a drum $k$ and capable of rotating upon the said tube. An endless screw or worm $l$ gears with a worm wheel $m$ fixed on the sleeve $i$. This worm $l$ is carried by a shaft working in two bearings carried by the drums $k$. This drum is supported by a shaft $n$ upon which it is free to rotate. A connecting rod $o$ imparts an oscillating movement to the drum $k$. The regulating weight or fly wheel $a$ carries a stud or shaft $p$ connected by a rod $r$ to one extremity of a lever $s$ the other extremity of which is supported by a pin $t$ attached to the drum $k$. The lever $s$ is connected by a pin $u$ situated nearly in a line with the central shaft or axis $n$ to a connecting rod $v$ acted on by a spring $c$ which constantly tends to move the said rod upward or in the direction of the arrow $y'$ (Fig. 4). The tension or stress of this spring is transmitted through the lever $s$ and rod $r$ to the regulating weight or fly wheel $a$ and acts upon the latter in a direction tangential to its circumference. This force is applied in a direction which tends to press the teeth of the toothed ring $b'$ against the pawls $d$. The regulating weight $a$ is consequently engaged between two drivers acting similarly to the two hereinbefore described, one of the said drivers being formed by the spring $c$ and the other by the pawl or pawls $d$. The angle or inclination of the lever $s$ and that of the rod $r$ are adjusted in such a manner that the pressure of the spring $c$ which varies according to the compression of the spring produces a constant force exerted at the circumference of the fly wheel or weight $a$ within the limits of the movements of the parts. The oscillating movement communicated in the direction of the arrow $y$ to the drum $k$ by the connecting rod $o$ is transmitted by the intervention of the worm $l$ to the wheel $m$, sleeve $i$, pawls $d$ and to the weight $a$. This weight then exerts upon the driver acting with constant force or pressure formed by the spring $c$ reactions which vary with the square of the speed according to the curves in Fig. 2. When this force of reaction exceeds the tension of the spring (represented by X Fig. 2) the latter yields and the weight $a$ becomes displaced that is to say in addition to the general oscillating motion of the system in which it participates it rotates upon the rings or bearings $g$. The toothed ring $b$ then moves relatively to the pawls $d$ to an extent of say three teeth for example in the direction of the arrow $y$. The pawls $d$ prevent the weight $a$ from returning to its former position under the action of the spring $c$ when the force of inertia again becomes inferior to the pressure or tension X of the said spring.

A ratchet wheel $l'$ is fixed upon the shaft of the worm $l$. A pawl or driver $m'$ is worked by a connecting rod $n'$ and the lever $o'$ vibrating on a pin $p'$ carried by the drum $k$. The other arm or extremity of the lever $o'$ is connected by a rod $r'$ with a fixed pin or pivot $s'$. This pin or center being stationary the oscillations of the drum $k$ cause the lever $o'$ to oscillate upon the center $p'$. This movement produces by the intervention of the pawl or driver $m'$ a rotary motion of the worm $l$ which displaces the pawls $d$ in the opposite direction to that indicated by the arrow $y$ to an extent which is fixed and constant being independent of the force of inertia and depending exclusively upon the angle of oscillation of the drum $k$. This displacement of the pawls $d$ in the direction opposite to that of the arrow $y$ produces a corresponding movement of the weight $a$ in this direction. When the motor is running at normal speed this movement is equal to the previous displacement of the weight $a$ in the direction of the arrow $y$ which is assumed in the present instance to be equal to three teeth of the ring $b'$.

In the course of one double oscillation of the drum $k$ which actuates all the other parts of the governor the weight $a$, assuming the speed to be normal, is displaced upon the bearings $g$ as follows, viz:—(first) in the direction of the arrow $y$ to an extent equivalent to three teeth of the ring $b'$ by the action of the forces of inertia resulting from the variations in the speed, (second) in the opposite direction to the arrow $y$ to an extent likewise equivalent to three teeth of the ring $b'$ by the action of the worm $l$ worked by the pawl or driver $m'$ and lever $o'$. In case the speed increases beyond the proper limits the reactions due to inertia become correspondingly greater or more powerful the first displacement increases and becomes equal to four teeth of the ring $b'$ for example. The second displacement being unchanged or constant the limits of the motion of the weight $a$ are moved about the central axis $n$ until the normal rate of speed has been resumed. When the speed diminishes the same action takes place in the opposite direction.

As the result of the position of the pin or center $u$ which is practically in line with the main or central shaft $n$ the said center does not become displaced laterally by the oscillation of the drum $k$. This oscillation simply produces a partial rotation of the pin $u$ and does not act upon the connecting rod $v$. On the other hand the rotation of the weight $a$ upon the bearings $g$ causes the lever $s$ to vibrate within the limits or between the two extreme positions represented by the dotted center lines in Figs. 4 and 5. This vibrating movement is transmitted directly to the connecting rod $v$. It may be utilized for actuating the regulating devices (throttle valves, expansion valves and the like). These devices may also be actuated by means of a connecting rod directly connected to any suitable part of the weight $a$, the rotation of the said weight upon the bearings $g$ having the effect of displacing the trajectory or line described by the extremity of the said rod. The regulating devices may also as represented in Fig. 11 be worked by the extremity of a lever $i'$ centered at $j'$ upon the drum $k$ and pivotally connected at $k'$ to the weight $a$ or vice versa. The spring $c$ acts upon the connecting rod $v$ at the extremity $c'$. The other extremity of the said spring bears upon a screwed sleeve or guide $c^2$ (Fig. 3) provided with a hand wheel $o^3$ which enables the tension or pressure of the spring to be adjusted for the purpose of changing the normal speed which is to be maintained by the action of the apparatus. Moreover by completely lowering the guide $c^2$ into the position represented in Fig. 6 its lower extremity can be caused to bear upon a shoulder $e'$ formed upon the rod $v$ so as to retain the weight $a$ of the governor in one of its extreme positions being for example the position which corresponds with the stoppage of the engine controlled by the said governor.

The force represented by the line X, Fig. 2, which balances the reactions exerted by the inertia of the regulating weight upon the driver acting with constant force until the moment when the weight is displaced in overcoming this force is not exclusively produced by the tension of the spring $c$ but is derived from three sources namely:—(first) the tension of the said spring, (second) the resistance due to the inertia of the accessory parts transmitting the movement resulting from the displacement of the weight to the regulating devices and (third) the friction of the moving parts actuated by the regulating or governing action of the apparatus. The two first of these three elements are constant or invariable; the third is likewise practically constant its fluctuations being quite insignificant relatively to the total force X (Fig. 2). This is what is hereinbefore referred to in the statement setting forth that all disturbing actions are obviated in the improved governor, the friction and inertia of the parts which are elements of irregularity in the centrifugal governor being directly utilized in the present apparatus and caused to contribute to the normal action of the governor.

An additional advantage of the improved apparatus is the following, namely:—In the centrifugal governors heretofore employed for regulating the speed of steam engines and other like motors the disturbing action of the friction must always be sufficient to cause the fluctuations of speed which occur during one revolution of the shaft to have no effect upon the governor in order to obviate oscillations of the latter. In the improved governor on the other hand the fluctuations or variations in speed which arise during one revolution of the shaft have no effect upon the governor the controlling weight of the latter not being in constant equilibrium like the weights of the centrifugal governor. The condition of equilibrium exists momentarily only at the precise moment in which the reaction exerted by the inertia of the weight upon the driver acting with constant force is equal to the force X in Fig. 2. In all other positions one of the two forces is in excess over the other. The governor is consequently influenced solely by the variations in the normal speed which cause corresponding variations in the governor at the moment when it is in equilibrium. This condition combined with the absence of disturbing forces hereinbefore referred to enables a mathematically constant or uniform speed to be obtained in all positions of the improved governor.

According to the modification illustrated in Fig. 12 the spring $c$ is subjected to tensional force in place of compressing force but the action is the same as in the arrangements illustrated in Figs. 3 to 10 as will be readily understood by reference to the drawings without further explanation. Fig. 13 llustrates a modification of this arrangement in which a counterweight $t'$ and lever acting in the same direction are simply substituted for the spring $c$.

Figure 15:
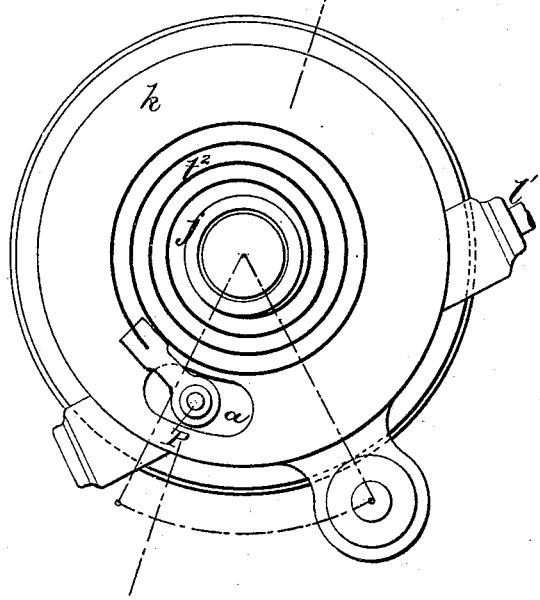

According to the arrangement illustrated in section and in elevation respectively in Figs. 14 and 15 a spirally coiled spring $t^2$ is employed to perform the functions of the spring $c$ hereinbefore described one extremity of the said spring $t^2$ being connected with the sleeve or tube $j$ and the other extremity being attached to the pin or center $p$ on the weight $a$.

Figure 16:
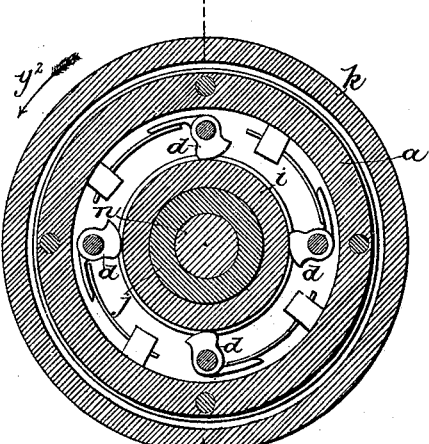
Figure 17:
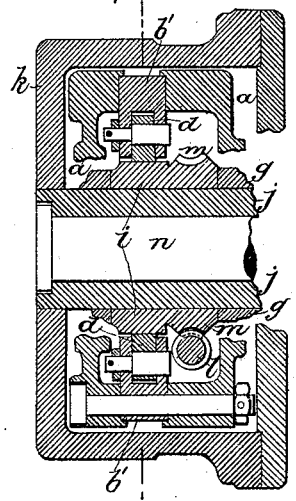

Figs. 16 and 17 illustrate in sections taken in planes at right angles to one another a modified arrangement of the driving pawls $d$ which in this case act by friction. In place of engaging with the teeth of a toothed ring they are so formed that the rotation of the mass $a$ in the direction of the arrow $y^2$ tends to take them off the sleeve $i$ and allow the weight to rotate independently but when the weight $a$ rotates in the opposite direction to the arrow $y^2$ the pawls or drivers resist this motion being wedged against the sleeve $i$. Springs are provided as represented in Fig. 16 for the purpose of maintaining the drivers in contact with the said sleeve.

Fig. 18 illustrates in elevation an arrangement in which the regulating weight $a$ is divided into two parts $a$ and $a'$. Two ratchet toothed wheels $f'$ and $f^2$ are connected together and a lever $g'$ partakes of an oscillating motion which is communicated to it by a connecting rod $h'$. Driving pawls $i^2$ are suspended on centers $j^2$ carried by this lever and are connected by rods $k^2$ with a fixed point or stationary center $l^2$. In consequence of this arrangement the two pawls $i^2$ are caused to act upon the teeth of the wheel $f'$ and slip over them alternately. The weight $a$ divided into the two parts $a$ and $a'$ carry driving pawls $d$ engaging with the teeth of the wheel $f^2$. The weights $a$ $a'$ are carried by an arm or lever $n^2$. The wheels $f'$ $f^2$, the lever $g'$ and the arms $n^2$ are loose or free to rotate independently of one another upon the central shaft or axis $o^2$. When the lever $g'$ moves in the direction of the arrow $y^3$ it carries with it the wheels $f'$ and $f^2$ through the intervention of one of the pawls $i^2$. The wheel $f^2$ then moves the weights $a$ $a'$ through the action of the pawls $d$. When the force of traction generated by the inertia of the weights $a$ $a'$ exerted on the spring $c$ by which the lever $g'$ is connected to the arms $n^2$ becomes greater than the tension or stress X (Fig. 2) of this spring the weights $a$ are displaced in the direction of the arrow $y^3$ being moved relatively to the wheel $f^2$. The pawls $d$ then travel over the periphery of the said wheel. During the second period of the oscillation when the lever $g'$ moves in the opposite direction to the arrow $y^3$ the forces resulting from the inertia of the weights $a$ $a'$ cause the pawls or drivers $d$ to act upon the teeth of the wheel $f^2$ and consequently cause the wheel $f'$ to act upon the pawls $i^2$. One of these pawls escapes from the teeth of the wheel $f'$ in consequence of its oscillation upon the center or pin $j^3$ and allows the wheels $f'$ and $f^2$ and the weights $a$ $a'$ to be displaced under the combined action of the forces of inertia and of the spring $c$ in the opposite direction to that indicated by the arrow $y^3$ until the teeth of the wheel $f'$ engage with the second pawl $i^2$. At normal speed this displacement is equal to that of the weights $a$ $a'$ in the direction of the arrow $y^3$ under the action of the force of inertia. Any change in the speed creates a corresponding change in the second of these two displacements but as the first is constant this change has the effect of displacing the limits of the movement performed by the weights $a$ $a'$ as hereinbefore described.

In this form of construction the spring $c$ constitutes the driver acting with constant or uniform force the pawls $d$ and wheel $f^2$ constituting the driver acting with constant displacement.

In case of need the springs or counter-weights producing the constant force may be dispensed with this force being produced by the weight of the regulating or governing weight itself. In this case the rod $b$ in the arrangement illustrated in Fig. 1 is placed in a vertical position and the pawl $d$ is placed at the lower part of the said rod. With this arrangement the normal rate of speed can be adjusted by altering the travel or stroke of the rod $b$.

What I claim is—

1. A speed regulator comprising a regulating weight, two drivers therefor, one of the said drivers exerting a constant and adjustable force, the other exerting variable force, the said weight being connected with the regulating device (throttle or expansion valve) of a steam engine or other motor, the said weight producing on each driver reactions due to the inertia of the weight, thereby displacing itself and the two drivers, mechanism actuated by the engine or motor to be governed, to subject the second or variable driver to a displacement in the opposite direction to the first, all substantially as hereinbefore described.

2. A speed regulator or governor comprising a weight, a part having an oscillating motion imparted to it by the engine and adapted to push the weight in one direction, and to positively move the weight a certain distance in the other direction, in combination with a spring or counterweight tending to move the weight in the last named direction, all substantially as and for the purposes set forth.

3. In a speed regulator or governor the combination of a circular weight, bearings upon which the weight partakes of an oscillating movement, a drum inclosing the weight and adapted to be oscillated about a center, connections between the said drum and the weight whereby the said weight is pushed in one direction by one movement of the drum and turned a certain distance in the opposite direction by the other movement of the drum, with a spring or counter-weight and a lever actuated thereby and connections between the drum and the weight to which connections the said lever is pivoted, whereby the said pivoting point is changed by a change in the relative positions of the drum and weight, all substantially as set forth.

4. In a speed regulator or governor, the combination of a circular weight provided with teeth, bearings upon which the weight may oscillate, a drum inclosing the weight and adapted to be oscillated about a center by the engine to be governed, a worm shaft carried by the drum, a gear-wheel gearing with the said worm and provided with pawls to engage the teeth in the weight, with a spring or counterweight and a lever $v$ actuated thereby, a lever $s$ pivoted to the said drum and to which the lever $v$ is pivoted and a lever $r$ connected to the weight and to the lever $s$, all substantially as and for the purposes set forth.

In testimony whereof I have signed my name to this specification in the presence of two subscribing witnesses.

FREDERIC ALBERT WEYHER.

Witnesses:
LÉON FRANCKEN,
CLYDE SHROPSHIRE.